United States Patent [19]

Hounsel

[11] Patent Number: 4,492,382

[45] Date of Patent: Jan. 8, 1985

[54] REFRACTORY FIBER LADLE PREHEATER SEALING RINGS

[75] Inventor: Mack A. Hounsel, Houston, Tex.

[73] Assignee: J. T. Thorpe Company, Houston, Tex.

[21] Appl. No.: 564,745

[22] Filed: Dec. 21, 1983

[51] Int. Cl.³ .................. F16J 15/02; F27B 14/08
[52] U.S. Cl. ............................ 277/12; 266/283; 266/286; 277/32
[58] Field of Search .......... 266/44, 141, 280, 283, 266/286, 901; 277/12, 32

[56] References Cited

U.S. PATENT DOCUMENTS

| | | | |
|---|---|---|---|
| 1,917,849 | 7/1933 | Northrup | 266/286 X |
| 2,253,098 | 8/1941 | Schneider | 277/12 X |
| 3,140,333 | 7/1964 | Tredennick et al. | 266/283 |
| 3,183,625 | 5/1965 | Agnew | 266/283 X |
| 3,527,450 | 9/1970 | Wishon et al. | 266/280 X |
| 4,229,211 | 10/1980 | Battles | 266/44 X |
| 4,364,729 | 12/1982 | Fresch | 266/141 X |

Primary Examiner—Robert S. Ward
Attorney, Agent, or Firm—Pravel, Gambrell, Hewitt & Kimball

[57] ABSTRACT

Sealing rings for ladle preheaters. The rings may be either fixedly or removably mounted with the ladle preheater frame. The rings seal about the ladle rim adjacent burner and flue openings of the preheater. Refractory fiber insulation is provided for insulating the space between the rim of the ladle and the preheater to prevent hot gas escaping. The refractory fiber is arranged into trapezoidal units which are easily installed and replaced.

23 Claims, 7 Drawing Figures

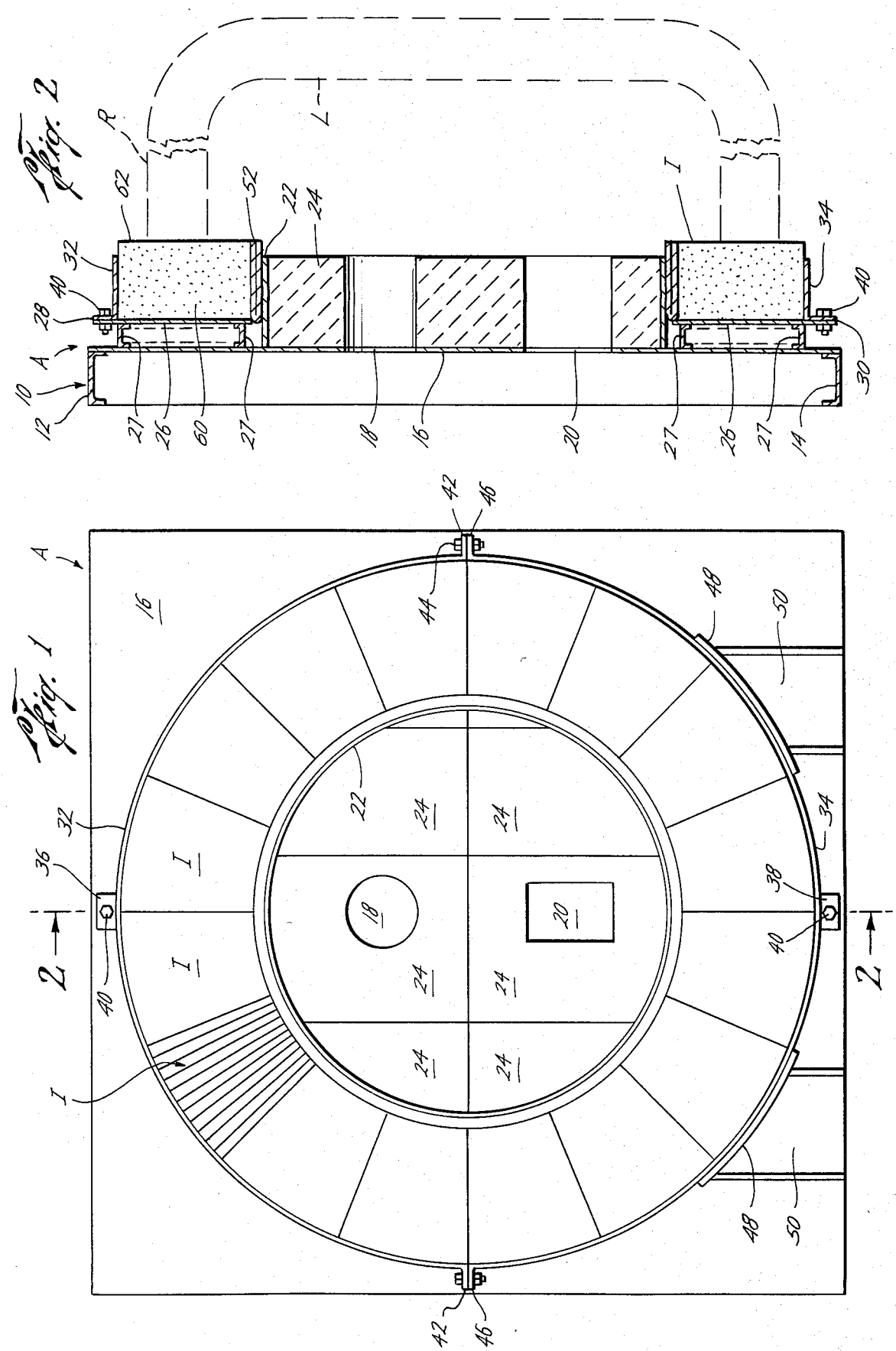

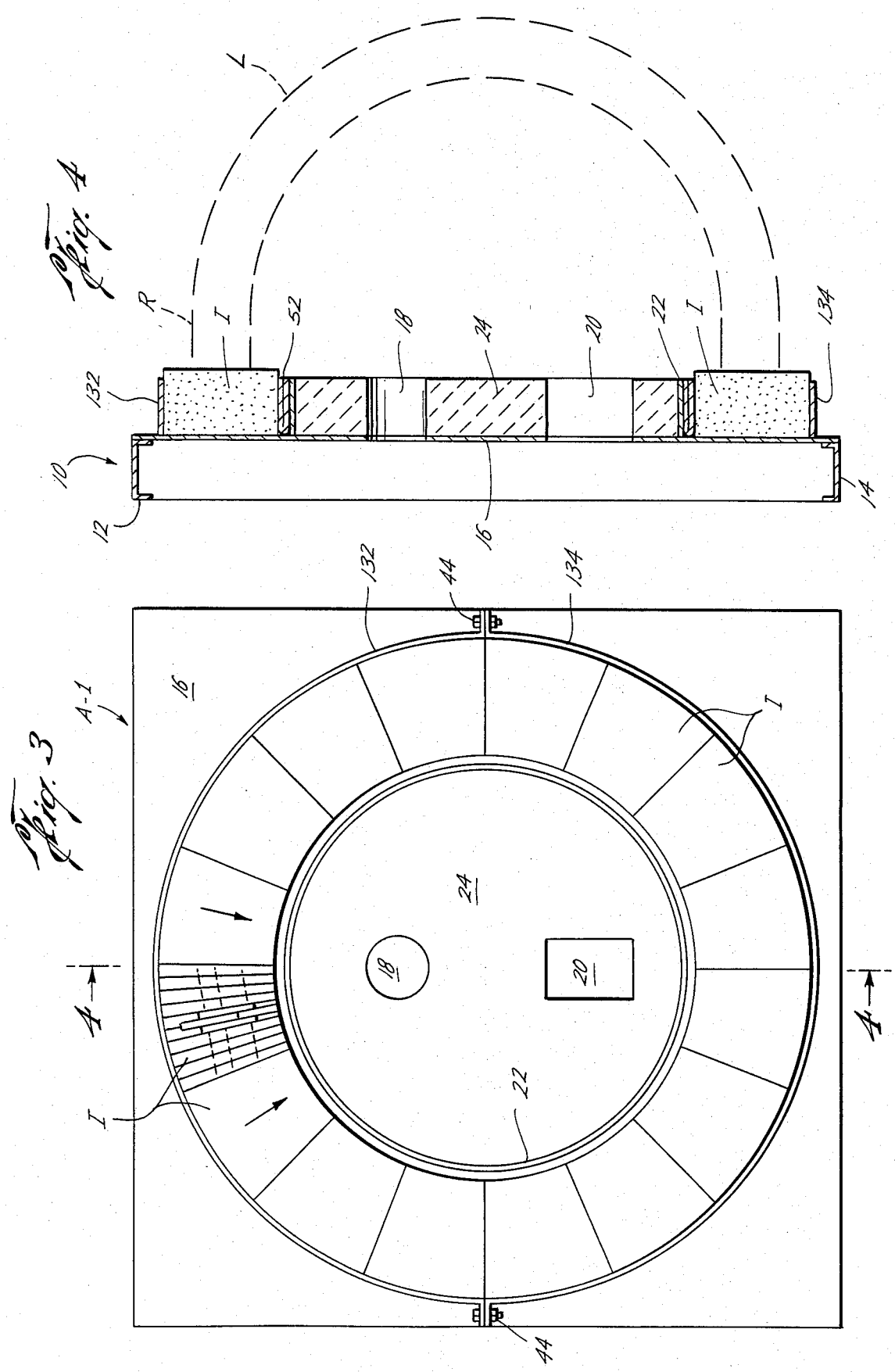

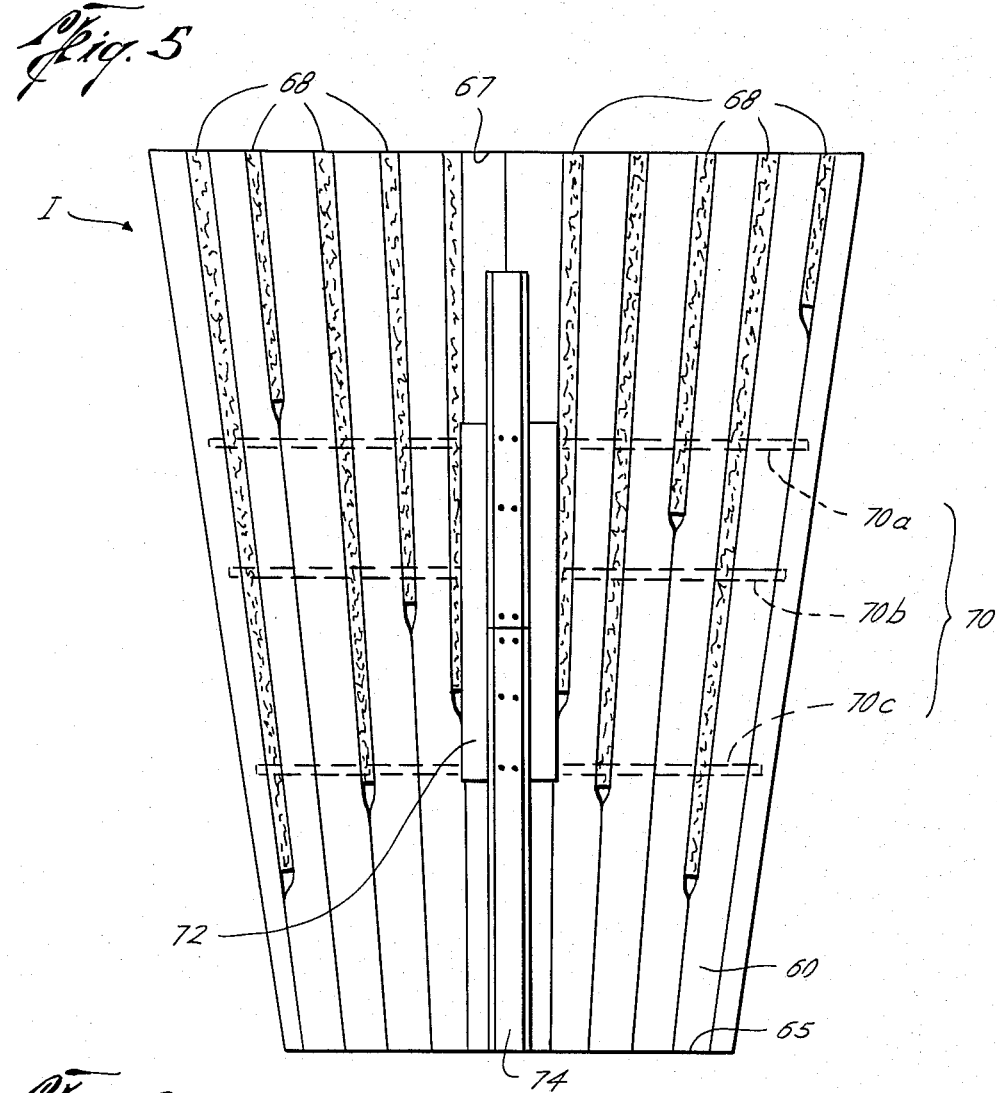
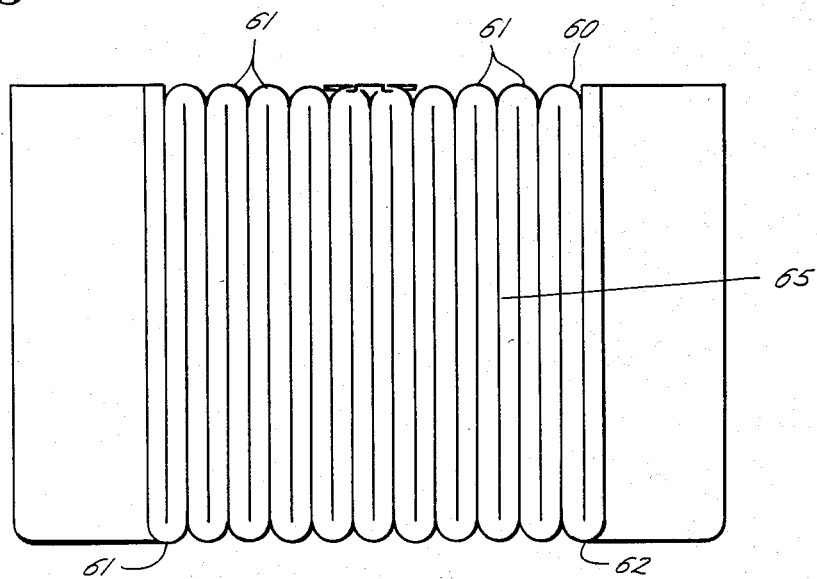

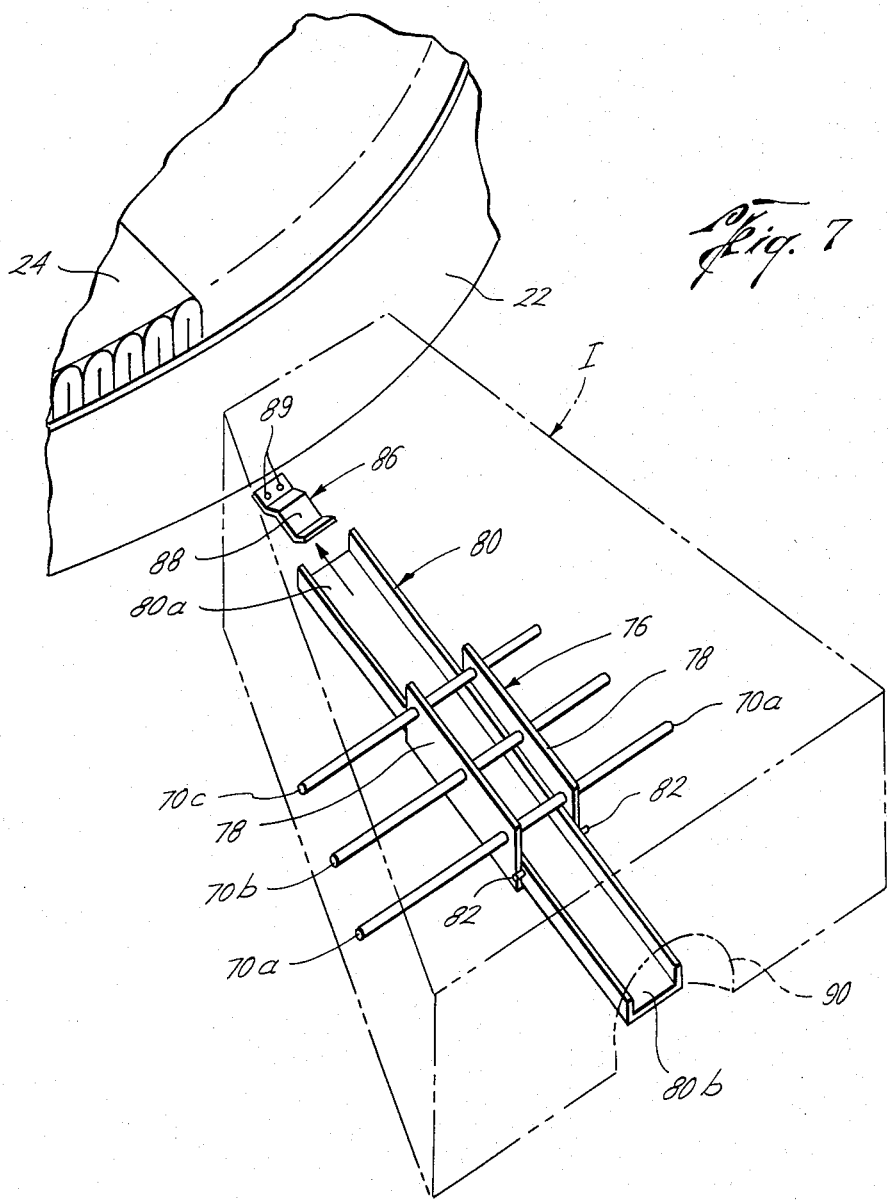

REFRACTORY FIBER LADLE PREHEATER SEALING RINGS

BACKGROUND OF THE INVENTION

1. Field of Invention

The present invention relates to insulating and sealing rings for ladle preheaters.

2. Description of Prior Art

U.S. Pat. Nos. 4,229,211 and 4,364,729 related to ladle preheating systems which incorporate a refractory fiber lined wall or lid which mechanically seals against the rim of the ladle. A burner and flue arrangement are centrally located on the wall or lid. The mechanical sealing function is critical to the efficient containment of the combustion gases. In these systems, substantially the entire rectangular support frame or plate was covered with refractory ceramic fiber modules, such as those according to U.S. Pat. No. 4,001,996. These modules, typically having square prismic shape, were installed in a uniform grid pattern. Since the ladle rim was usually of circular or oval construction, the modules in the outer corners of the frame served no useful function other than support for the modules which did lie within the seal area. Establishing a circular or oval seal area with a uniform square grid pattern involved the use of inactive modules. This increased the cost of construction and maintenance. The ladle rim was a generally uneven surface and the modules during repeated sealing actions were worn and displaced. Joints between adjacent modules in the sealing area were often forced apart because of this effect. This caused loss of sealing effectiveness and the possibility of damaging heat leakage.

U.S. Pat. No. 4,223,873 disclosed a ladle preheater with a circular seal of ceramic fiber compaction material. However, no structural details of this seal, or how it was to be installed and supported, were given. The rectangular ceramic fiber modules used for furnace wall insulation, such as those of U.S. Pat. No. 4,001,996 mentioned above, and others on the market, did not lend themselves to forming circular seals. There are several ways that attempts could be made to use them, but none was satisfactory. These square or rectangular modules could be cut to fit a circular or oval seal pattern. This would cause material waste and increased installation costs. Even more importantly, however, the structural integrity and thus the compressive effects between adjacent modules would be reduced. Alternatively, these modules could be arranged about a generally circular pattern, leaving gaps in spaces between adjacent modules where curved surfaces were necessary. This would require stuffing to be inserted in the spaces, increasing installation costs and resulting in irregular compressive effects.

SUMMARY OF INVENTION

Briefly, the present invention provides a new and improved apparatus for sealing the rim of a ladle as it is positioned adjacent a ladle preheater. A retainer member is formed on a front frame support of a preheater adjacent a burner inlet and an exhaust outlet of the preheater, enclosing the portions of the front frame support in the vicinity of the inlet and outlet. A plurality of refractory fiber ring insulation units or modules are provided to engage and seal with the ladle rim, while also providing insulation in the space between the rim and the preheater. Each of the modules includes a plurality of adjacent layers of refractory ceramic fiber insulating material having an inner surface portion adjacent the preheater and an outer surface portion adapted to be contacted by the rim of the ladle during preheating. The refractory fiber insulation units are mounted by a mounting means which conforms to the shape of the rim of the ladle, whether oval or circular. The layers of the refractory ceramic fiber insulation unit are mounted on the mounting means in planes which extend radially outwardly from a central portion of the ladle so that the fiber insulation units are trapezoidal in shape, extending radially outwardly from an inner face to an outer face of greater extent than the inner face.

With trapeziodal insulation units according to the present invention, compression is attained between adjacent modules along lines of radial extent of the fiber layers. This diametrical compression is substantially uniform over the entire seal area rather than randomly criss-crossing the seal area. The sealing forces imposed by the ladle actually encourage the modules to seal more tightly together. In previous designs, the partial engagement of some modules caused intramodular displacement and caused gaps to open up. The seal ring of the present invention in contrast behaves more as a compress monolithic mass of fiber rather than a collection of individual modules. The result of the present invention is longer life and more positive sealing action. The natural keying action of trapezoidal shapes also makes installation and maintenance much easier. The sealing apparatus of the present invention with trapezoidal insulating units also permits a new and improved insulating apparatus for ladle preheaters. Areas of the preheater adjacent the burner can be lined with different types of insulation than that sealing the ladle rim. This affords longer insulation service life and reduces cost.

BRIEF DESCRIPTION OF THE DRAWINGS

FIG. 1 is an elevation view of a removale ladle preheater seal ring according to the present invention;

FIG. 2 is a cross-sectional view taken along the lines 2—2 of FIG. 1;

FIG. 3 is an elevation view of a fixed ladle preheater seal ring according to the present invention;

FIG. 4 is a cross-sectional view taken along the lines 4—4 of FIG. 3;

FIG. 5 is a plan view of a refractory fiber insulation module used in the seal rings of FIGS. 1 through 4, inclusive;

FIG. 6 is an elevation view of the refractory fiber insulation module of FIG. 5;

FIG. 7 is an isometric view, partially schematic, of an alternative attachment mechanism of the present invention for modules in a ladle preheater seal ring.

DESCRIPTION OF PREFERRED EMBODIMENT

In the drawings, the letter A designates generally a sealing ring apparatus according to the present invention for sealing a rim R of a ladle L as the ladle L is positioned adjacent a ladle preheater. The ladle preheater may be a vertical or horizontal preheater, and may be any one of several types commercially available and structural details thereof, with the exception of a front or top frame support 10, are not shown. In the preferred embodiment, the front frame support 10 includes upper and lower support beams 12 and 14 and side beams to which a front metal plate 16 is attached. A burner opening 18 is formed in the plate 16 so that hot gases from the burner of the preheater may enter the interior of the ladle L in order to preheat the ladle L. An exhaust opening 20 is formed in the plate 16 so that continuous circulation of heated gases from the burner opening 18 into the interior of the ladle L and out of the exhaust outlet 20 may occur.

A cylindrical inner section retainer member 22 is mounted extending outwardly from the front frame support 16 of the preheater and encloses the portions of the front frame 16 adjacent the burner inlet 18 and exhaust outlet 20 of the preheater. Portions of the front frame support 16 enclosed within the retainer member 22 are suitably insulated. In the preferred embodiment, a plurality of modular refractory ceramic fiber insulation modules 24 are mounted on the front frame support for insulation purposes. The primary function of the modules 24 is to insulate the front frame 16 of the preheater from conditions within the ladle and to reduce heat loss. These modules 24 may be of any of the types currently marketed, such as in U.S. Pat. No. 4,001,996. It should be understood, however, that other fiber modules, such as the types known in the art as "edge grain" or "nip and tuck" may be used as well. Also, layered fiber construction, brick or other conventional hard refractories may be used in place or refractory fiber modules. Openings are formed in the modules 24 adjacent the burner inlet 18 and exhaust outlet 20 for the entry and exit of the gases into the interior of the ladle L.

A seal ring assembly frame member 26 is mounted on the frame support member 16 of the preheater and extends across the face of the support member 16 in a shape conforming to the rim R to be preheated. Thus, the seal ring assembly frame may be circular, elliptical or oval in configuration in the plane in which contact is made with the rim R, based upon the configuration of the rim R. Structural rails or beams 27 of the apparatus A are mounted with the seal ring assembly frame member 26 and extend towards the frame support 16 to stiffen the seal ring assembly 26 and also to insure proper positioning of the seal ring A with respect to the frame support 16. It is to be noted that the structural beams 27 are not, however, permanently connected to the frame support 16 of the preheater, although they may be bolted thereto for stability of the apparatus A in use. In this manner, in the event that the seal ring apparatus A needs replacement or repair, it may be removed as a complete assembly and another apparatus A easily installed with minimum down or inoperable time for the preheater. Also, replacement or repair of the apparatus A can be accomplished without disturbing the refractory modules 24 in the center section within retainer member 22. Different diameter removable seal ring apparatus A can also be provided for use with one preheater to accommodate different sizes of ladles.

It should be pointed out that with the present invention, maintenance or complete replacement of the seal ring can be done without involving the independently lined center section. Previously, this area was relined each time the seal area modules were replaced, since trying to save certain modules during tearout was too tedious. Whether the center section of the present invention is lined with fiber modules or conventional hard refractories, it may outlive numerous seal rings, saving considerable time and expense in maintenance and downtime.

On a typical ladle preheater, field operations indicate that the present invention can more than double the average life of the seal area while cutting the material cost for a relining job in half, since the center section is used over and over again. Downtime reductions are also significant.

An upper attachment tab 28 and a lower attachment tab 30 are formed as outward extensions of the mounting frame 26 so that an upper compression or retainer ring 32 and a lower compression or retainer ring 34 may be attached to the mounting frame 26 at upper and lower attachment tabs 36 and 38, respectively, by bolts or other suitable mounting means 40. The upper compression ring 32 has side mounting tabs or lugs 42 which are adapted to be connected by bolts 44 or other suitable attaching means to side attachment tabs 46 on the lower compression ring 34. The compression rings 32 and 34 support the insulation units I in place against retainer member 22 and resist outward movement of these units when contacted by the rim R. Cradle arms 48 are mounted on support beams 50 to support the compression rings 32 and 34 above the surface of the area adjacent the preheater. The cradle arms 48 support the load of the removable seal ring apparatus A when it is positioned with the preheater for sealing against the rim R.

A plurality of refractory fiber ring insulation units I of the seal ring apparatus A are mounted about the periphery of the seal ring assembly frame 26 extending radially within the space between the inner section retainer member 22 and the compression rings 32 and 34. The insulation units I function to seal against the rim R when contacted and to insulate the area of contact between the rim R and the preheater. A packing or gasket 52 is inserted about the retainer member 22 after installation of the insulation units I to seal any annular space therebetween.

Considering the insulation units I more in detail, each takes the form of a plurality of adjacent layers of a suitable, commercially available, refractory ceramic fiber insulating material, the particular fiber which is used being based on the expected temperature and service conditions. Each of the units I has an inner surface portion 60 adapted to be positioned adjacent the mounting frame 26 and an outer surface portion 62 adapted to be contacted by the rim R of the ladle L. Intermediate portions 64 of the adjacent layers of refractory ceramic fiber insulating material extend between the inner surface portion 60 and the outer portion 62. Previously, all the modules comprising the preheater lining were by necessity of the same thickness. The high wear seal area demanded a thicker module than was needed to insulate the inner area. The present invention provides independent optimization of module thickness in the seal area for resistance to mechanical abuse and for cost effective insulation of the inner area inside retainer member 22. Typically, the thickness of the units I between inner surface portion 60 and outer surface portion 62 is greater than that of the modules 24, in some cases as much as seven inches. In this manner, the units I are first to be contacted and damaged by slag from the ladle L. Since the units I are easier to replace, an advantage is provided by using different thicknesses of sealing units I and insulating modules 24.

Thus, the rim sealing apparatus A with the trapezoidal modules I and the modules 24 within the retainer member 22 form a new and improved insulating apparatus for ladle preheaters with the advantages discussed above. In certain situations, the trapezoidal modules I need not have radially oriented fiber layers. Rather, they may be trapezoidal with layers extending between folds adjacent the retainer member 22 and folds adjacent the rings 32 and 34. Also, the layers may extend diametrically from the center portion of the ladle L between folds at the side faces of the trapezoidal module or between folds against the mounting frame 26 and folds adapted to be contacted by the rim R. Another alternative is to form a composite monolithic trapezoidal module from a number of layers of cut refractory material.

In the embodiment shown in the drawings, folds 61 are formed at side portions from adjacent ones of the plurality of adjacent layers at each of the inner surface portion 60 and outer surface portion 62, forming an accordion-style ceramic fiber blanket. It should be understood, however, that in the insulating units I only the inner surface portions 60 or the outer surface portions 62 may have folds 61 formed, as in U.S. Pat. No. 3,952,470. Also, the insulating units I may have the refractory fiber in the form of edge-grain layers, with no folds formed at either the inner surface portion 60 or the outer surface portion 62.

In the insulating unit I, refractory ceramic stuffing strips 68 are mounted between selected ones of the plurality of adjacent layers, causing the insulating unit I to form a trapezoidal shape (FIG. 5). With trapezoidal insulation units I of the present invention, several advantages are afforded. The layers of blanket in the units I are radially oriented in planes extending outwardly, between inner faces 65 and outer faces 67 of the unit I, from a central portion of the ladle. When the ladle rim R is circular, the center point of the rim R serves as the point of origin for the radial orientation of the layers of the blanket. If the rim R is oval or elliptical, a point at or near the general center of each arcuate surface may serve as the point of origin. Where the rim is an elongate oval, rectangular modules, such as according to U.S. Pat. No. 4,001,996 and other types on the market, may be used along the straight portions of the oval. This radial orientation of the fiber layers produces substantially uniform diametrical compression between adjacent units I about the frame member 26, without the presence of any connecting joints between them in the seal area. The trapezoidal shape of the units I also permits them to be individually installed and removed without obstruction by adjacent units and with little, if any, effect on adjacent units.

The insulating units I receive a plurality of mounting support rods 70 which extend transversely through the plurality of transverse layers of the unit I in the intermediate portions 64 at a suitable distance from inner surface portion 60. The support rods 70 are of a length slightly less than the transverse dimension of the trapezoidal insulating unit I at the location in which they are inserted. As can be seen in FIG. 5, each of the rods 70a, 70b and 70c is of a different length.

The rods 70 are received in openings formed in a C-shaped channel member 72, much in the manner, for example, of U.S. Pat. No. 4,381,634. The channel member 72 is mounted with an attachment member 74 which attaches the support channel 72 through the seal ring assembly frame 26 to the preheater. The attachment member 74 may be of any of the forms shown in U.S. Pat. Nos. 3,952,470, 4,001,996 and 4,381,634 or other commercially available attachment structure.

In a preferred embodiment of the present invention, however, an alternative attachment mechanism (FIG. 7) is utilized which provides for natural keying action by permitting radial sliding motion (see the arrows in FIG. 3) of the modules I during installation. This mechanism also insures that the insulating units I do not move radially outwardly after installation and that the insulating units I are firmly and properly moved into the appropriate position during installation. The attachment mechanism is particularly suitable for installation when the surface of frame support 16 is warped or uneven. In the embodiment of FIG. 7, like structure to that of FIGS. 1 through 6 bears like reference numerals. The rods 70 are received in a C-shaped beam or support channel 76 whose legs 78 extend inwardly from the inner surface portion 60 of the insulating unit I. The arms 78 of the beam channel 76 extend between adjacent layers of the insulating unit, much in the manner, for example, of U.S. Pat. No. 4,381,634. It should be noted that the other compression rings 32 and 34 hold all the modules I tightly against the inner section 22 but are not acted upon by the diametrical compression of the modules. There are no radial forces on the rings due to fiber compression. The ring of modules is stable without inner or outer restraint. A slide channel member 80 is received within the beam channel member 76 inwardly of the rods 70. The slide channel member 80 has limit lugs 82 formed at side portions thereof. The limit lugs 82 on the slide channel 80 also prevent movement of the insulating units I on the lower half of the frame support 26 away from the center portion of the preheating unit due to gravity during installation.

An inner stopping bracket 86 having a locking snap arm 88 formed therewith is fixedly attached, such as by welding studs in openings 89, to the front of the support ring 26 at each location where an insulating unit I is to be installed. The limit stop 86 is adapted to engage an inner end 80a of slide channel 80 when the insulating unit I has been properly positioned on the face of the support ring 26. A pocket recess 90 is formed by removing a portion of the unit I adjacent an outer end 80b of slide channel 80 so that the outer end 80b is accessible to be welded or fastened to the support ring 26 once the unit I is in proper position against the center retainer ring member 22. The compression rings 32 and 34 are then attached. The beam channel member 76 slides along slide channel member 80 when the units I are contacted by compression rings 32 and 34. This insures that the rods 70 travel with the fibers in the units I to prevent fiber tearing.

In an alternative seal ring apparatus A-1 of the present invention, like structure to that of the apparatus A, bears like reference numerals. In the seal ring apparatus A-1, the insulating units I are fixedly mounted with the front face of the support member 16 of the preheater, as are an upper compression ring 134 and a lower compression ring 132 after the insulating units I have been installed. Typically, the packing 52 is installed in apparatus A-1 before the units I and the compression rings 132 and 134. The units I are attached directly to the preheater frame support 16 rather than to a movable member. However, such attachment is otherwise made in a like manner to that of apparatus A. Thereafter, the compression rings 132 and 134 are used to urge the units I inwardly into position and compression rings 132 and 134 are then connected together by bolts 44, and also attached to the frame support 16, such as by welding. In this embodiment, repair or servicing of individual ones of the insulating units I requires that the preheater be taken out of service, rather than removal of the apparatus A and replacement by a new presealing unit, while individual ones of the insulating units I are repaired.

The foregoing disclosure and description of the invention are illustrative and explanatory thereof, and various changes in the size, shape and materials, as well as in the details of the illustrated construction may be made without departing from the spirit of the invention.

I claim:

1. An apparatus for sealing the rim of a ladle as it is positioned adjacent a ladle preheater, comprising:
   (a) a plurality of refractory fiber ring insulation units, each of said units comprising:
      (1) a plurality of adjacent layers of refractory ceramic fiber insulating material;
      (2) said layers having an inner surface portion adjacent the preheater;
      (3) said layers further having an outer surface portion adapted to be contacted by the rim of the ladle during preheating of the ladle;
      (4) said layers further having intermediate portions extending between said inner and outer surface portions;
   (b) means conforming to the shape of the rim of the ladle for mounting said plurality of refractory fiber insulation units adjacent the preheater;
   (c) said layers being mounted on said means for mounting in planes extending radially outwardly from a central portion of the ladle.

2. The apparatus of claim 1, wherein said insulation units have inner and outer faces transverse to their radial mounting planes and further including:
   (a) an inner section retainer member mounted to the frame support of the preheater for enclosing the frame support adjacent a burner inlet and exhaust outlet for the preheater; and
   (b) compression ring means for supporting said insulation units in position when contacted by the ladle rim.

3. The apparatus of claim 2, further including:
   a layer of refractory fiber insulation mounted between said inner faces of said units and said inner section retainer member.

4. The apparatus of claim 2, further including:
   a seal ring assembly frame member adapted to be positioned adjacent the frame support of the preheater.

5. The apparatus of claim 4, further including:
   means for removably attaching said compression ring means to said seal ring assembly frame.

6. The apparatus of claim 5, wherein said means for mounting comprises:
   means for mounting said insulation units on said seal ring assembly frame.

7. The apparatus of claim 6, further including:
   cradle means for supporting said seal ring assembly frame and said units adjacent the preheater.

8. The apparatus of claim 2, wherein:
   said compression ring means is fixedly mounted to the frame support of the preheater.

9. The apparatus of claim 8, wherein said means for mounting comprises:
   means for mounting said insulation units on the frame support of the preheater.

10. The apparatus of claim 2, further including:
    a plurality of burner and exhaust refractory fiber insulation units mounted on said frame support within the interior of said retainer member.

11. The apparatus of claim 10, wherein:
    said burner and exhaust refractory fiber insulation units are of different thickness than said ring refractory fiber insulation units.

12. The apparatus of claim 1, further including:
    side portions formed from adjacent ones of said plurality of adjacent layers at said inner surface portions to form alternating inner folds.

13. The apparatus of claim 1, further including:
    side portions formed from adjacent ones of said plurality of adjacent layers at said outer surface portions to form alternating outer folds.

14. The apparatus of claim 1, further including:
    side portions formed from adjacent ones of said plurality of adjacent layers at said inner surface portions to form alternating inner folds; and
    side portions formed from adjacent ones of said plurality of adjacent layers at said outer surface portions to form alternating outer folds.

15. The apparatus of claim 1, further including:
    refractory ceramic fiber stuffing strips mounted between selected ones of said plurality of adjacent layers to cause said units to be trapezoidal.

16. The apparatus of claim 1, wherein said means for mounting comprises:
    (a) mounting rod means extending transversely through said plurality of transverse layers in said intermediate portions thereof; and
    (b) means for connecting said mounting support rod means to the preheater.

17. The apparatus of claim 16, wherein said means for connecting comprises:
    (a) a support channel having openings therein for receiving said mounting support rod means therein;
    (b) means for attaching said support channel to the preheater.

18. The apparatus of claim 17, further including:
    a slide channel member movably mounted with said support channel for relative movement to resist tearing of the fiber insulating material by said support rod means during installation.

19. The apparatus of claim 18, further including:
    limit means for preventing movement of said units due to gravity during installation.

20. The apparatus of claim 18, further including:
    stopping bracket means mounted for engaging an inner end of said slide channel member when said insulation units are in proper mounting position.

21. An apparatus insulating a ladle preheater as it is preheating ladles, comprising:
    (a) an inner section retainer member mounted to a frame support of the preheater for enclosing the frame support adjacent a burner inlet and an exhaust outlet for the preheater;
    (b) a plurality of burner and exhaust refractory insulation units mounted on said frame support within the interior of said retainer member;
    (c) a plurality of trapezoidal refractory fiber ring insulation units for sealing with the ladle rim and insulating the space between the ladle rim and the preheater; and
    (d) means conforming to the shape of the rim of the ladle for mounting said plurality of trapezoidal refractory fiber insulation units adjacent the preheater.

22. The apparatus of claim 21, further including:
    compression ring means for supporting said insulation units in position when contacted by the ladle rim.

23. The apparatus of claim 21, wherein:
    said burner and exhaust refractory insulation units are of lesser thickness than said ring refractory fiber insulation units.

* * * * *